US012225239B2

(12) United States Patent
Toderici et al.

(10) Patent No.: US 12,225,239 B2
(45) Date of Patent: *Feb. 11, 2025

(54) HIGH-FIDELITY GENERATIVE IMAGE COMPRESSION

(71) Applicant: Google LLC, Mountain View, CA (US)

(72) Inventors: George Dan Toderici, Mountain View, CA (US); Fabian Julius Mentzer, Zürich (CH); Eirikur Thor Agustsson, Zürich (CH); Michael Tobias Tschannen, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,068

(22) Filed: Aug. 25, 2023

(65) Prior Publication Data

US 2024/0107079 A1 Mar. 28, 2024

Related U.S. Application Data

(63) Continuation of application No. 17/107,684, filed on Nov. 30, 2020, now Pat. No. 11,750,848.

(51) Int. Cl.
*G06V 10/00* (2022.01)
*G06N 3/045* (2023.01)
(Continued)

(52) U.S. Cl.
CPC ............ *H04N 19/91* (2014.11); *G06N 3/045* (2023.01); *G06N 3/088* (2013.01); *H04N 19/124* (2014.11); *H04N 19/154* (2014.11)

(58) Field of Classification Search
CPC ............ G06N 3/08; G06N 3/02; G06N 3/042; G06N 3/045; G06N 3/047; G06N 3/082;
(Continued)

(56) References Cited

U.S. PATENT DOCUMENTS 10,432,953 B2 10/2019 Wierstra et al.
10,818,043 B1 * 10/2020 Barnes ................. G06T 7/40
(Continued)

OTHER PUBLICATIONS

Agustsson et al., "Generative adversarial networks for extreme learned image compression," Proceedings of the IEEE/CVF International Conference on Computer Vision, 2019, 11 pages.
(Continued)

*Primary Examiner* — Amir Alavi
(74) *Attorney, Agent, or Firm* — Fish & Richardson P.C.

(57) ABSTRACT

Methods, systems, and apparatus, including computer programs encoded on a computer storage medium, for training an encoder neural network configured to receive a data item and to process the data item to output a compressed representation of the data item. In one aspect, a method includes, for each training data item: processing the data item using the encoder neural network to generate a latent representation of the training data item; processing the latent representation using a hyper-encoder neural network to determine a conditional entropy model; generating a compressed representation of the training data item; processing the compressed representation using a decoder neural network to generate a reconstruction of the training data item; processing the reconstruction of the training data item using a discriminator neural network to generate a discriminator network output; evaluating a first loss function; and determining an update to the current values of the encoder network parameters.

20 Claims, 4 Drawing Sheets

(51) Int. Cl.
  *G06N 3/088* (2023.01)
  *H04N 19/124* (2014.01)
  *H04N 19/154* (2014.01)
  *H04N 19/91* (2014.01)
(58) Field of Classification Search
  CPC ...... G06N 3/088; G06N 3/092; G06N 3/0454;
          G06N 3/0475; G06N 3/0464; G06N
          3/084; G06N 20/00; G06N 20/10; G06N
          20/20; G04N 19/463; G04N 19/91; G04N
                          19/124; G04N 19/154
  See application file for complete search history.

(56) References Cited

U.S. PATENT DOCUMENTS

| | | | |
|---|---|---|---|
| 11,257,254 | B2 | 2/2022 | Minnen et al. |
| 11,257,507 | B2* | 2/2022 | Garbacea ............... G06N 3/08 |
| 11,295,729 | B2* | 4/2022 | Jeon ..................... G10L 15/22 |
| 11,374,952 | B1* | 6/2022 | Coskun ................ G06N 3/045 |
| 11,403,513 | B2 | 8/2022 | Hasenclever et al. |
| 11,461,660 | B1 | 10/2022 | Davies |
| 11,477,468 | B2 | 10/2022 | Lee et al. |
| 11,538,197 | B2 | 12/2022 | Minnen et al. |
| 11,544,880 | B2 | 1/2023 | Park et al. |
| 11,558,620 | B2* | 1/2023 | Besenbruch ........... H04N 19/59 |
| 11,568,207 | B2* | 1/2023 | Van Den Oord ....... G06F 18/22 |
| 11,716,641 | B1* | 8/2023 | Mayer ................ H04L 1/0026 370/252 |
| 11,750,848 | B2* | 9/2023 | Toderici ............... G06N 3/088 382/157 |
| 11,875,269 | B2* | 1/2024 | Donahue ............... G06N 3/045 |
| 11,948,075 | B2* | 4/2024 | Kavukcuoglu ........ G06N 3/084 |
| 11,995,528 | B2* | 5/2024 | Van den Oord ..... G06V 10/764 |
| 2019/0035633 | A1 | 1/2019 | Jha et al. |
| 2020/0027247 | A1 | 1/2020 | Minnen et al. |
| 2020/0104680 | A1* | 4/2020 | Reed ................ G06V 10/7715 |

OTHER PUBLICATIONS

Agustsson et al., "Ntire 2017 challenge on single image super-resolution: Dataset and study," Proceedings of the IEEE Conference on Computer Vision and Pattern Recognition Workshops, 2017, 10 pages.
Agustsson et al., "Soft-to-hard vector quantization for end-to-end learning compressible representations," arXiv preprint arXiv:1704.00648, Apr. 2017, 16 pages.
Ba et al., "Layer normalization," arXiv preprint arXiv:1607.06450, Jul. 2016, 14 pages.
Ballé et al., "End-to-end optimized image compression," arXiv preprint arXiv:1611.01704, Nov. 2016, 27 pages.
Ballé et al., "Variational image compression with a scale hyperprior," arXiv preprint arXiv:1802.01436, Feb. 2018, 23 pages.
Bellard.org [online], "BPG image format," 2015, retrieved on Jan. 13, 2021, retrieved from URL<https://bellard.org/bpg>, 2 pages.
Binkowski et al., "Demystifying mmd gans," arXiv preprint arXiv:1801.01401, Jan. 2018, 36 pages.
Blau et al., "Rethinking lossy compression: The rate-distortion-perception tradeoff," International Conference on Machine Learning, May 2019, 11 pages.
Brock et al., "Large scale GAN training for high fidelity natural image synthesis," arXiv preprint arXiv:1809.11096, Sep. 2018, 35 pages.
Chen et al., "Image blind denoising with generative adversarial network based noise modeling," Proceedings of the IEEE Conference on Computer Vision and Pattern Recognition, 2018, 10 pages.
Coulom et al., "Whole-history rating: A Bayesian rating system for players of time- varying strength," International Conference on Computers and Games, Sep. 2008, 13 pages.
Coulombe et al., "Low-complexity transcoding of JPEG images with near-optimal quality using a predictive quality factor and scaling parameters," IEEE transactions on image processing, Dec. 2009, 19(3):712-21.
Developers.google.com [online], "A new image format for the Web," May 2020, retrieved on Mar. 22, 2021, retrieved from URL<https://developers.google.com/speed/webp>, 2 pages.
Galteri et al., "Deep generative adversarial compression artifact removal," Proceedings of the IEEE International Conference on Computer Vision, 2017, 10 pages.
Glickman et al., "A comprehensive guide to chess ratings," American Chess Journal, 1995, 3(1):59-102.
Goodfellow et al., "Generative adversarial networks," arXiv preprint arXiv:1406.2661, Jun. 2014, 9 pages.
Heusel et al., "Gans trained by a two time-scale update rule converge to a local nash equilibrium," arXiv preprint arXiv:1706.08500, Jun. 2017, 38 pages.
Huszar F, Theis L, Shi W, Cunningham A. Lossy Image Compression with Compressive Autoencoders.
Ioffe et al., "Batch normalization: Accelerating deep network training by reducing internal covariate shift," International conference on machine learning, Jun. 2015, 9 pages.
Karras et al., "A style-based generator architecture for generative adversarial networks," Proceedings of the IEEE/CVF Conference on Computer Vision and Pattern Recognition, 2019, 4401-4410.
Karras et al., "Progressive growing of gans for improved quality, stability, and variation," arXiv preprint arXiv:1710.10196, Oct. 2017, 26 pages.
Kingma et al., "Adam: A method for stochastic optimization," arXiv preprint arXiv:1412.6980, Dec. 2014, 15 pages.
Kurach et al., "A large-scale study on regularization and normalization in GANs," International Conference on Machine Learning, May 2019, 10 pages.
Ledig et al., "Photo-realistic single image super-resolution using a generative adversarial network," Proceedings of the IEEE conference on computer vision and pattern recognition, 2017, 10 pages.
Lee et al., "Context-adaptive entropy model for end-to-end optimized image compression," ar Xiv preprint arXiv:1809.10452, Sep. 2018, 20 pages.
Li et al., "Learning convolutional networks for content-weighted image compression," Proceedings of the IEEE Conference on Computer Vision and Pattern Recognition, 2018, 10 pages.
Li et al., "Positional normalization," arXiv preprint arXiv:1907.04312, Jul. 2019, 20 pages.
Lucic et al., "Are gans created equal? a large-scale study," arXiv preprint arXiv:1711.10337, Nov. 2017, 21 pages.
Marpe et al., "Context-based adaptive binary arithmetic coding in the H. 264/AVC video compression standard," IEEE Transactions on circuits and systems for video technology, Aug. 2003, 13(7):620-36.
Mentzer et al., "Conditional probability models for deep image compression," Proceedings of the IEEE Conference on Computer Vision and Pattern Recognition, 2018, 9 pages.
Mentzer et al., "High-Fidelity Generative Image Compression," arXiv preprint arXiv:2006.09965, Jun. 2020, 20 pages.
Minnen et al., "Channel-wise autoregressive entropy models for learned image compression," 2020 IEEE International Conference on Image Processing (ICIP), Oct. 2020, 16 pages.
Minnen et al., "Joint autoregressive and hierarchical priors for learned image compression," arXiv preprint arXiv:1809.02736, Sep. 2018, 16 pages.
Mirza et al., "Conditional generative adversarial nets," arXiv preprint arXiv:1411.1784, Nov. 2014, 7 pages.
Mittal et al., "Making a "completely blind" image quality analyzer," IEEE Signal processing letters, Nov. 2012, 20(3):209-12.
Miyato et al., "Spectral normalization for generative adversarial networks," arXiv preprint arXiv:1802.05957, Feb. 2018, 26 pages.
Negahban et al., "Iterative ranking from pair-wise comparisons," Advances in neural information processing systems, 2012, 25:2474-82.
Park et al., "Semantic image synthesis with spatially-adaptive normalization," Proceedings of the IEEE/CVF Conference on Computer Vision and Pattern Recognition, 2019, 10 pages.
R0k.us [online], "Kodak Lossless True Color Image Suite," Kodak PhotoCD dataset, Nov. 15, 1999, retrieved Mar. 2021, retrieved from URL <http://r0k.us/graphics/kodak>, 3 pages.

(56) References Cited

OTHER PUBLICATIONS

Rippel et al., "Real-time adaptive image compression," International Conference on Machine Learning, Jul. 2017, 2922-2930.
Santurkar et al., "Generative compression," 2018 Picture Coding Symposium (PCS), Jun. 2018, 10 pages.
Simonyan et al., "Very deep convolutional networks for large-scale image recognition," arXiv preprint arXiv:1409.1556, Sep. 2014, 14 pages.
Sullivan et al., "Overview of the high efficiency video coding (HEVC) standard," IEEE Transactions on circuits and systems for video technology, Sep. 2012, 22(12):1649-68.
Taubman et al., "JPEG 2000: Image Compression Fundamentals," Standards and Practice, 2001, 779 pages.
Thomas et al., "Elements of information theory," John Wiley & Sons, 2012, 774 pages.
Toderici et al., "CLIC 2020: Challenge on Learned Image Compression," 2020, retrieved on Mar. 25, 2021, retrieved from URL<http://compression.cc>, 1 page.
Toderici et al., "Full resolution image compression with recurrent neural networks," Proceedings of the IEEE Conference on Computer Vision and Pattern Recognition, 2017, 9 pages.
Toderici et al., "Variable rate image compression with recurrent neural networks," arXiv preprint arXiv:1511.06085, Nov. 2015, 12 pages.
Tschannen et al., "Deep generative models for distributionpreserving lossy compression," In Advances in Neural Information Processing Systems, 2018, 12 pages.
Ulyanov et al., "Instance normalization: The missing ingredient for fast stylization," ar Xiv preprint arXiv:1607.08022, Jul. 2016, 6 pages.
Wallace et al., "The JPEG still picture compression standard," IEEE transactions on consumer electronics, Feb. 1992, 15 pages.
Wang et al., "High-resolution image synthesis and semantic manipulation with conditional gans," Proceedings of the IEEE conference on computer vision and pattern recognition, 2018, 10 pages.
Wang et al., "Image quality assessment: from error visibility to structural similarity," IEEE transactions on image processing, Apr. 2004, 13(4):600-12.
Wang et al., "Multiscale structural similarity for image quality assessment," The Thrity-Seventh Asilomar Conference on Signals, Systems & Computers, Nov. 2003, 5 pages.
Wu et al., "Group normalization," Proceedings of the European conference on computer vision (ECCV), 2018, 17 pages.
Xu et al., "Empirical evaluation of rectified activations in convolutional network," arXiv preprint arXiv:1505.00853, May 2015, 5 pages.
Zhang et al., "The unreasonable effectiveness of deep features as a perceptual metric," Proceedings of the IEEE conference on computer vision and pattern recognition, 2018, 10 pages.

\* cited by examiner

HIGH-FIDELITY GENERATIVE IMAGE COMPRESSION

CROSS REFERENCE TO RELATED APPLICATION

This application is a continuation of U.S. application Ser. No. 17/107,684, filed on Nov. 30, 2020. The disclosure of the prior application is considered part of and is incorporated by reference in the disclosure of this application.

BACKGROUND

This specification relates to training neural networks to compress data.

Compressing data refers to determining a representation of the data that occupies less space in a memory and/or requires less bandwidth for transmission, e.g. over a network. Compressed data may be stored (e.g., in a logical data storage area or physical data storage device), transmitted to a destination over a communications network (e.g., the Internet), or used in any other manner. Generally, the data can be reconstructed (either approximately or exactly) from the compressed representation of the data.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of weights.

SUMMARY

This specification describes a training system implemented as computer programs on one or more computers in one or more locations that trains a neural network system that performs data compression. The data to be compressed can be image data, video data, text data, or any other type of data.

Once trained, the neural network system can operate on any of a variety of different types of data items, e.g., images, videos, audio signals, and so on. As an example, the described system may be particularly effective for compressing high-dimensional (and therefore large) data items in a highly data efficient manner. For example, the trained neural network system can be used to compress and/or reconstruct high-resolution images, e.g., images containing 2000 or more pixels along each dimension, in a highly data efficient manner (e.g., in terms of bitrates).

Briefly, the neural network system includes a compression system and, in some cases, a decompression system. The compression system can generate (e.g., by an encoder neural network) a representation of the data as an ordered collection of code symbols (e.g., integer values). The compression system can entropy encode (e.g., by arithmetic coding) each code symbol subset using, e.g., custom code symbol probability distributions learned directly from the data to be compressed, or respective code symbol probability distributions from a dictionary of code symbol probability distributions that is learned from a set of training data. The compression system can determine the compressed representation of the data based on: (i) the entropy encoded representations of the code symbol subsets, and (ii) data indicating the respective code symbol probability distributions used to entropy encode the code symbol subsets.

The decompression system, when included, can process the compressed data representations generated by the compression system to generate (approximate or exact) reconstructions of the data.

To ensure effectiveness in training the neural network system, the described training system performs the training by jointly optimizing (i) a first term measuring a compression rate of the conditional entropy model, (ii) a second term measuring a quality of the reconstruction, and (iii) a third term measuring a difference between a discriminator neural network's classification of the reconstruction of the training data item and a ground truth classification of the training data item. These features and other features are described in more detail below.

The subject matter described in this specification can be implemented in particular embodiments so as to realize one or more of the following advantages.

Training neural network systems to effectively compress and reconstruct data can be hard because selecting an effective training objective can be difficult. In particular, objective functions that sufficiently evaluate an effectiveness in data compression or quality of reconstruction can be difficult to formulate. Additionally, some objectives (e.g., compression rate versus distortion or perceptual quality) are antagonistic against each other in nature and are thus inappropriate for direct use in common training schemes.

The described techniques allow essential components of compression and decompression systems, including an encoder neural network, hyper-encoder neural network, and a decoder neural network to be effectively trained using a perceptual loss-augmented generative adversarial network (GAN) training scheme. Training signals provided by this training scheme can encourage the neural networks to generate realistic-looking reconstructions of a range of data items from compressed representations, while satisfying desired compression rate requirements.

The described techniques can effectively train the neural networks to achieve or even exceed state of the art performance in training the neural networks used by data compression/decompression systems in a much more computationally efficient manner than existing training schemes, e.g., schemes that merely use rate-distortion or distortion-perception objectives.

Once trained, the compression/decompression systems allow for high-dimensional data items, e.g., high-resolution images, to be compressed and reconstructed in a very data efficient manner while ensuring high reconstruction quality. In particular, results that exceed the state of the art can be achieved while ensuring significant reduction in the amount of data that is transmitted, e.g., over a network, from the compression system to the decompression system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a training system implemented as computer programs on one or more computers in one or more locations that trains a neural network system that performs data compression. The data to be compressed can be image data, video data, text data, or any other type of data.

Figure 1:
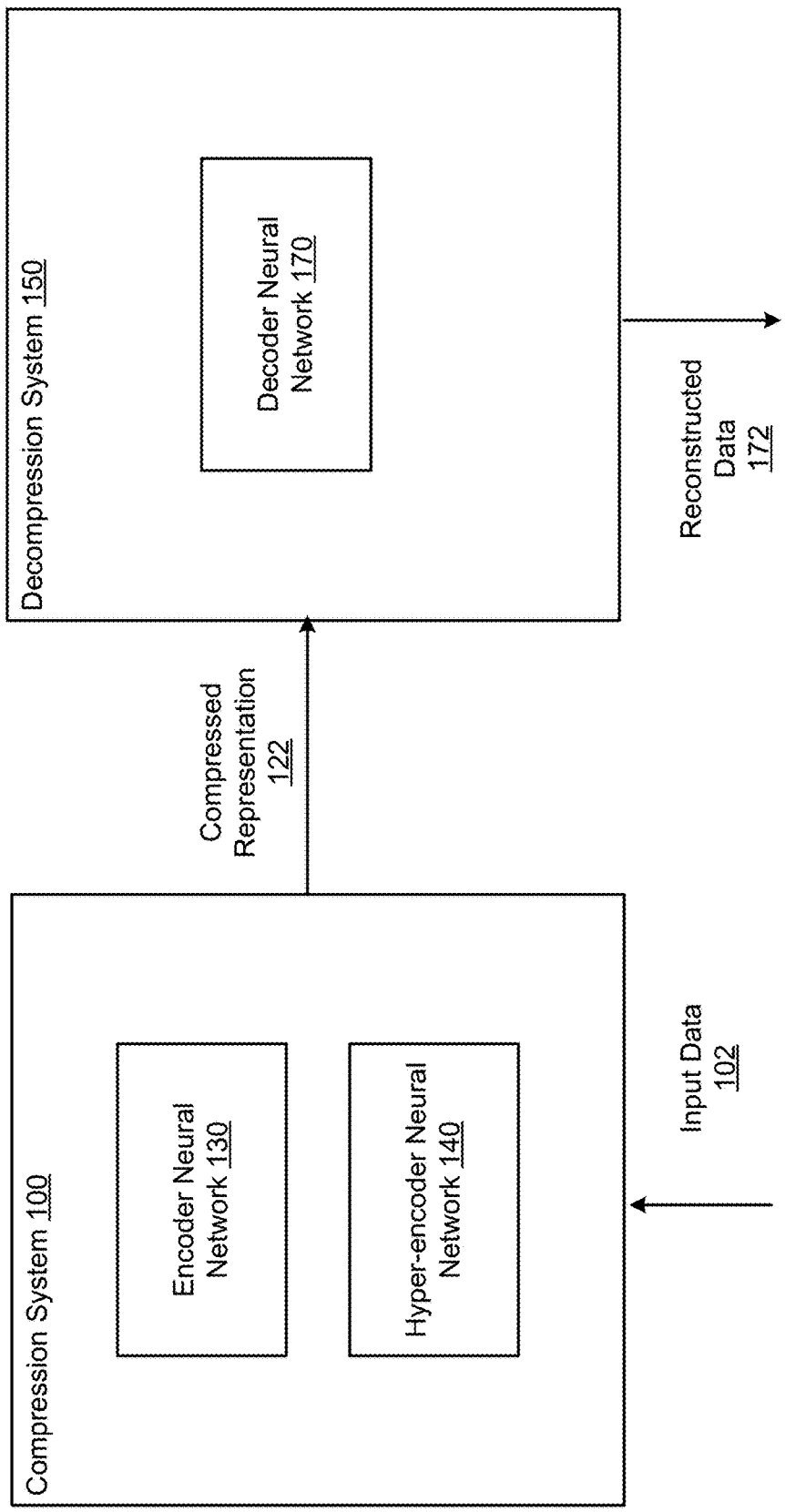
FIG. 1 is a block diagram of an example compression system and decompression system.

FIG. 1 is a block diagram of an example compression system 100 and an example decompression system 150. The compression system 100 and the decompression system 150 are example systems implemented as computer programs on one or more computers in one or more locations in which the systems, components, and techniques described below are implemented.

The compression system 100 is configured to process input data 102 (e.g., image data, audio data, video data, text data, or any other appropriate sort of data) to generate a compressed representation 122 of the input data. The decompression system can process the compressed data to generate an (approximate or exact) reconstruction 172 of the input data.

Although illustrated as being co-located, the compression system 100, the decompression system 150, and the software or hardware modules performing the operations of each system may actually be located on different computing devices or on different memory devices. Moreover, the compression system 100, the decompression system 150, or both can include components additional to those depicted in FIG. 1, e.g., an entropy encoding engine, a quantizing engine, or additional neural networks.

For example, the systems may be remotely located, and compressed data generated by the compression system 100 can be provided to the decompression system 150 in any of a variety of ways. For example, the compressed data may be stored (e.g., in a physical data storage device or logical data storage area), and then subsequently retrieved from storage and provided to the decompression system. As another example, the compressed data may be transmitted over a communication network (e.g., the Internet) to a destination, where it is subsequently retrieved and provided to the decompression system.

To compress the input data 102, the compression system 100 can process the input data 102 using the encoder neural network 130 to generate a latent representation of the input data 102. As used throughout this document, a "latent representation" of data refers to a representation of the data as an ordered collection of numerical values, e.g., a vector or matrix of numerical values. In one example, the input data may be an image, the encoder neural network 130 may be a convolutional neural network, and the latent representation of the input data may be a multi-channel feature map output by the final layer of the encoder neural network 130. Generally, the latent representation of the input data may be more compressible than the input data itself, and in some cases, may have a lower dimensionality than the input data.

To facilitate compression of the latent representation of the input data using entropy encoding techniques, the compression system 100 can quantize, e.g., by using a quantizing engine, the latent representation of the input data to generate an ordered collection of code symbols, e.g., in the form of a vector or matrix of code symbols. Quantizing a value refers to mapping the value to a member of a discrete set of possible code symbols. For example, the set of possible code symbols may be integer values, and the compression system 100 may perform quantization by rounding real-valued numbers to integer values.

The compression system 100 can then use the hyper-encoder neural network 140 to generate a conditional entropy model for entropy encoding the code symbols representing the input data.

The hyper-encoder neural network 140 is configured to process the latent representation of the input data to generate a "hyper-prior", that is, a latent representation of the conditional entropy model. In one example, the hyper-encoder neural network 108 may be a convolutional neural network, and the hyper-prior may be a multi-channel feature map output by the final layer of the hyper-encoder neural network 140. The hyper-prior implicitly characterizes an input data-dependent entropy model that will enable the code symbols representing the input data to be efficiently compressed.

The conditional entropy model specifies a respective code symbol probability distribution corresponding to each code symbols representing the input data. In one example, each code symbol probability distribution of the conditional entropy model may be a Gaussian distribution (parameterized by mean and standard deviation parameters) convolved with a unit uniform distribution.

The compression system 100 can then compress, e.g., using a entropy encoding engine, the code symbols representing the input data by entropy encoding them in accordance with the conditional entropy model. The entropy encoding engine can implement any appropriate entropy encoding technique, e.g., an arithmetic coding technique, a range coding technique, or a Huffman coding technique. The compressed code symbols may be represented in any of a variety of ways, e.g., as a bit string.

Finally, the compression system 100 can generate the compressed representation 122 of the input data 102 based on: (i) the compressed code symbols, and (ii) "side-information" characterizing the conditional entropy model used to compress the code symbols. For example, the compression system 100 may generate the compressed representation 122 of input data by concatenating respective bit strings representing the compressed code symbols and the compressed hyper-prior.

The decompression system 150 can decompress the data by recovering the conditional entropy model from the compressed data, and using the conditional entropy model to decompress (i.e., entropy decode) the compressed code symbols. The decompression system can then reconstruct the original input data by mapping the code symbols back to a reconstruction 172 of the input data. To this end, the decompression system 150 can implement components including a decoder neural network 170, which are configured to perform operations that approximately invert the operations performed by components of the compression system 100 as described above.

Neural network-based data compression/decompression using entropy encoding is described in more detail in US patent publication 20200027247 entitled "Data compression using conditional entropy models" Minnen et al. filed on Jul. 18, 2019 and published on Jan. 23, 2020, and in US patent publication US 2019035633 entitled "Data compression by local entropy encoding" Minnen et al. filed on May 21, 2018 and published on Nov. 21, 2019, which are herein incorporated by reference.

To allow the systems to effectively compress/decompress data, a training system can train the neural networks used by the compression and decompression systems 100 and 150 to determine trained values of the parameters of the neural networks. Specifically, the encoder neural network 130, hyper-encoder neural network 140, decoder neural network 170, and, in some implementations, other trainable components of the systems that are not shown in FIG. 1, are jointly trained using a perceptual loss-augmented generative adversarial network (GAN) training scheme, as will be described in more detail.

Figure 2:
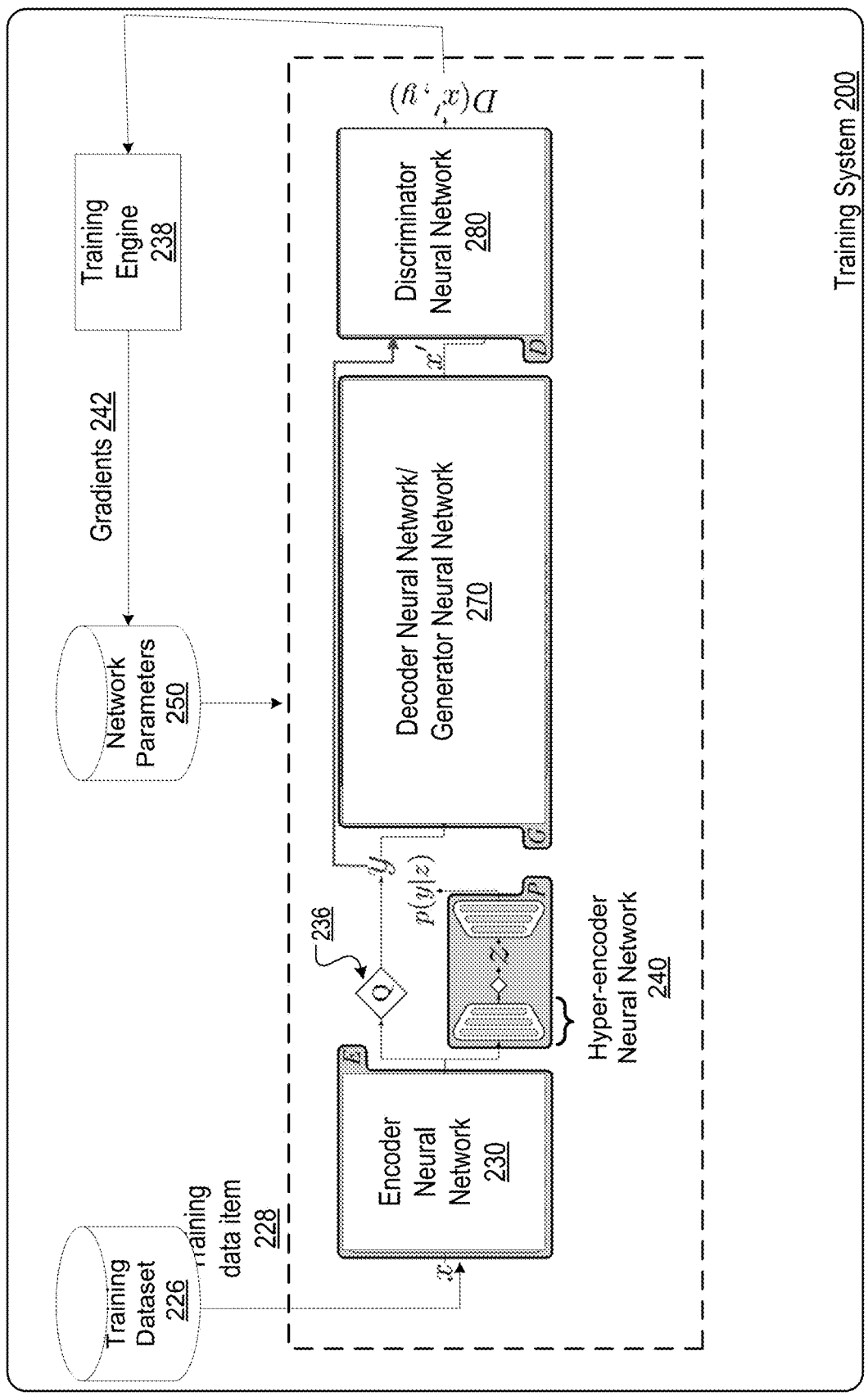
FIG. 2 is a block diagram of an example training system.

FIG. 2 is a block diagram of an example training system 200. The training system 200 is an example of a system implemented as computer programs on one or more computers in one or more locations, in which the systems, components, and techniques described below are implemented.

The training system 200 maintains a training dataset 226. In general, the training dataset 226 includes data of the same type as the input data 102 to be compressed. For example, if the input data 102 of FIG. 1 is image data then the training data 226 may include multiple images. The system can receive the training dataset 226 for training the neural networks in any of a variety of ways. For example, the system can receive training dataset 226 as an upload from a remote user of the system over a data communication network, e.g., using an application programming interface (API) made available by the system. As another example, the system can receive an input from a user specifying which data that is already maintained by the system should be used for training the neural networks.

A training engine 238 can use the training dataset 226 to train the neural networks, that is, to determine, e.g., from initial values, trained values of the network parameters 250 of a encoder neural network 230, a hyper-encoder neural network 240, a decoder neural network (also referred to as a generator neural network) 270, and a discriminator neural network 280.

In particular, the training engine 238 performs the training using a perceptual loss-augmented generative adversarial network (GAN) training scheme. Specifically, the training engine 238 iteratively trains the encoder neural network 230 and the hyper-encoder neural network 240 to generate accurate information that allow for a training data item x to be effectively compressed into a compressed representation y. In particular, such information includes information characterizing the conditional entropy model that is used to compress the collection of code symbols, i.e., the quantized latent representation "Q" 236, generated from the latent representation of the training data item. The training engine 238 also trains the generator neural network 270 to generate, from the compressed representation y, a reconstruction x' that is indistinguishable from the training data item x. Additionally, the training engine 238 trains the discriminator neural network 280 to tell apart the reconstruction x' and the training data item x, for example, by predicting 1 if a discriminator network input is classified as a training data item x and 0 if reconstruction x'.

At the end of each training iteration, the training engine 238 can compute a gradient with respect to the network parameters 250 of a loss function that depends on (i) a first term measuring a compression rate of the conditional entropy model, (ii) a second term measuring a quality of the reconstruction, and (iii) a third term measuring a difference between the discriminator's classification of the reconstruction of the training data item and a ground truth classification of the training data item. The training engine 238 can determine the gradients 242 of the loss function using, e.g., backpropagation techniques.

The training engine 238 then uses the gradient 242 to update the values of the network parameters 250, e.g., based on an appropriate gradient descent optimization technique (e.g., an RMSprop or Adam optimization procedure). Collectively, these terms can provide richer and more reliable training signals, e.g., compared with objective functions that merely evaluate perceptual or distortion loss. This can stabilize the training and render the overall training more effective.

The training engine 238 can continue training the neural networks until a training termination criterion is satisfied, e.g., until a predetermined number of training iterations have been performed, or until the gradient computed from the loss function is below a predetermined threshold value.

In some implementations, after the neural networks have been trained in this manner, the system 200 can deploy the trained neural networks and then uses the trained neural networks to compress new data items received from users, e.g., through the API provided by the system.

Instead of or in addition to using the trained neural networks, the system 200 can provide data specifying the final parameter values to a user who submitted a request to train the neural networks, e.g., through the API.

Generally, each neural network described in this document can have any appropriate neural network architecture that enables it to perform its described function. As an advantageous implementation, FIG. 3 shows example architectures of the neural networks used by the compression/decompression systems.

Figure 3:
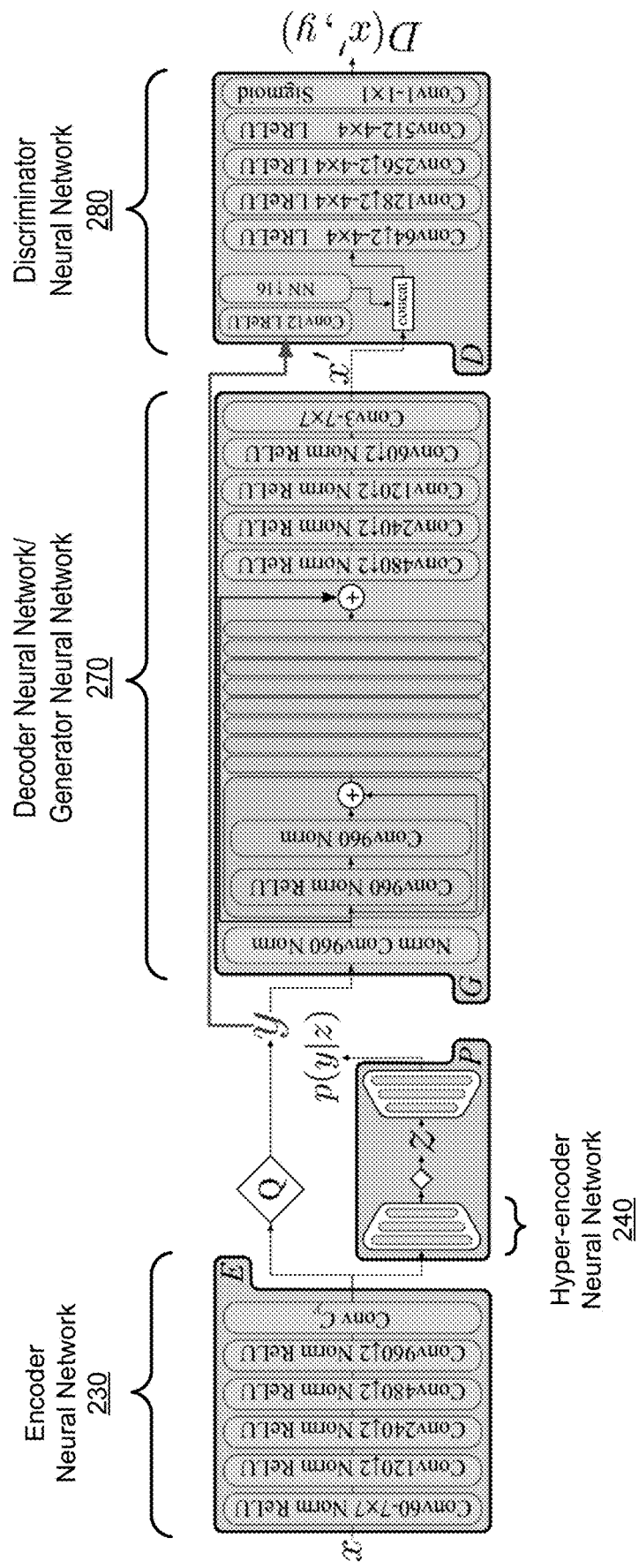
FIG. 3 shows example architectures of the neural networks used by the compression/decompression systems.

In the example of FIG. 3, the encoder neural network 230, the generator neural network 270, and the discriminator neural network 280 are each a respective convolutional neural network, i.e., a neural network including one or more convolutional layers.

As depicted, convolutional layers are specified with the "Conv" prefix followed by number of channels C, kernel size (3×3 by default, except when denoted otherwise), and upsampling ("↑")/downsampling ("↓") stride. For example, the third leftmost layer of the encoder neural network 230 uses 240 channels with 3×3 kernels and a downsampling stride of 2.

"ReLU" stands for rectified linear unit activation function, and "LReLU" is the leaky rectified linear unit activation function with α=0.2. Similarly, "Sigmoid" stands for sigmoid activation function.

"NN↑16" stands for nearest neighbor upsampling with size 4×4.

Notably, "Norm" stands for "ChannelNorm" layer which normalizes over channels only, e.g., compared with existing normalization layers, e.g., BatchNorm or LayerNorm layers, which normalize over both space and batches, both space and channels, respectively. In mathematical terms, the ChannelNorm layer normalizes an input that has the form of a batch of C×H×W dimensional feature maps $f_{chw}$ into $$f'_{chw} = \frac{f_{chw} - \mu_{hw}}{\sigma_{hw}} \alpha_c + \beta_c, \text{ where } \mu_{hw} = 1/C \sum_{c=1}^{C} f_{chw}$$
$$\sigma^2_{hw} = 1/C \sum_{c=1}^{C} (f_{chw} - \mu_{hw})^2,$$

in accordance with trained values of per-channel offset parameters $\alpha_c$, $\beta_c$.

In addition, in the example of FIG. 3, the discriminator neural network 280 is a single-scale discriminator that includes one or more spectral normalization layers. The discriminator neural network 280 is configured as a conditional discriminator that can make predictions of classifications of network inputs conditioned on the compressed representation y. As depicted, the discriminator neural network 280 is provided with a concatenation of a network input (i.e., a training data item x or a reconstruction x') and an upscaled version of the compressed representation y.

Figure 4:
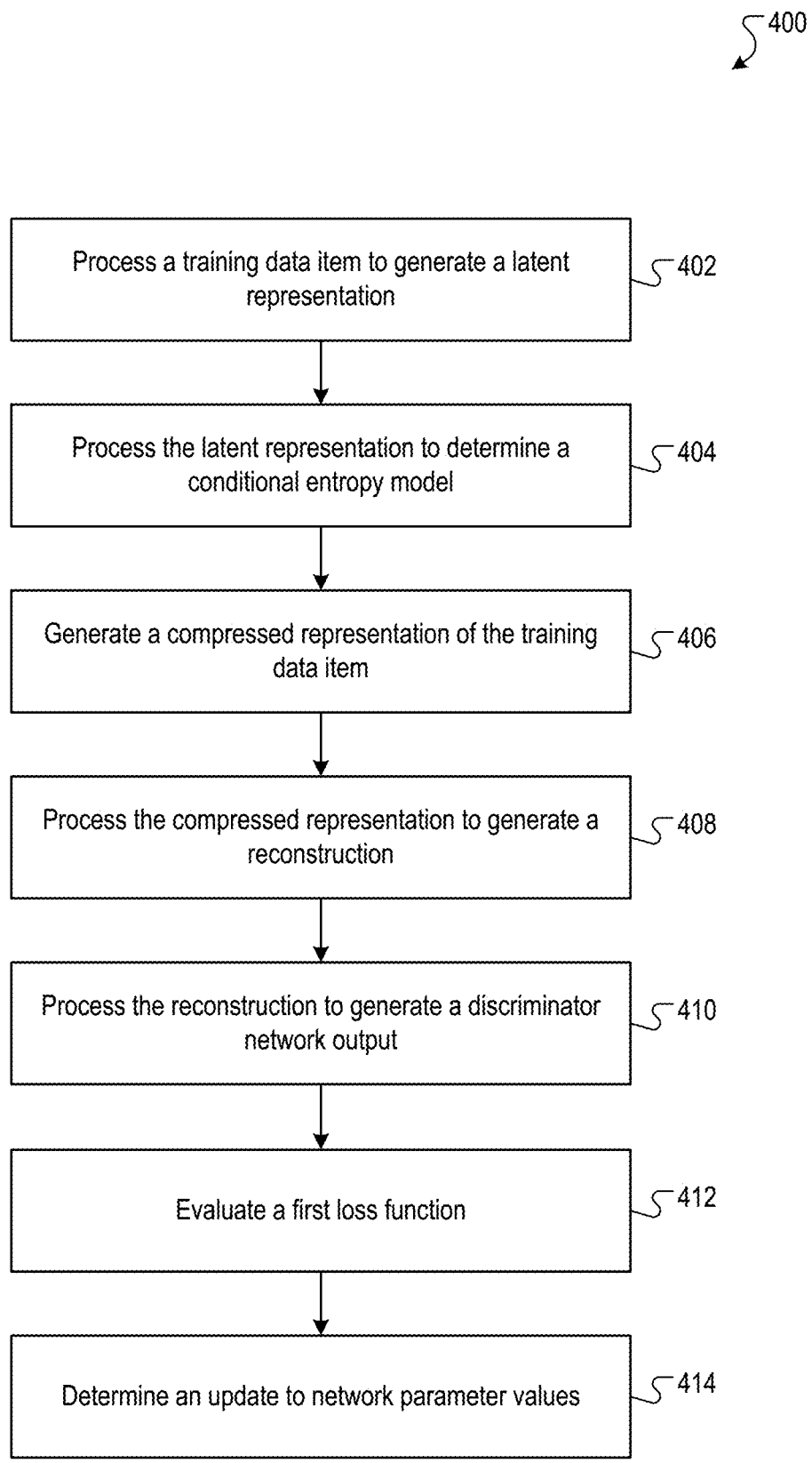
FIG. 4 is a flow diagram of an example process for training the neural networks used by the compression/decompression systems.

FIG. 4 is a flow diagram of an example process 400 for training the neural networks used by the compression/decompression systems. For convenience, the process 400 will be described as being performed by a system of one or more computers located in one or more locations. For example, a training system, e.g., the training system 200 of FIG. 2, appropriately programmed in accordance with this specification, can perform the process 400.

At the beginning of each iteration of process 400, the system receives one or more training data items, i.e., the data items to be compressed. The training data item may be any appropriate form of data, e.g., image data, audio data, or text data.

The system processes the training data item using the encoder neural network and in accordance with current values of the encoder network parameters to generate a latent representation of the training data item (402). In one example, the training data item is an image or a video frame, the encoder neural network is a convolutional neural network, and the latent representation of the data is an ordered collection of feature maps output by the final layer of the encoder neural network.

The system determines an entropy model that is used to entropy encode the (quantized) latent representation of the training data item. The entropy model can define a respective code symbol probability distribution (i.e., probability distribution over the set of possible code symbols) corresponding to each code symbol in the ordered collection of code symbols representing the input data.

In some implementations, the entropy model can be a predetermined entropy model and the system can receive data defining the entropy model from a user of the system, e.g., as an upload from the user of the system over a data communication network, e.g., using an application programming interface (API) made available by the system.

In some other implementations, the entropy model can be a conditional entropy model, i.e., an entropy model that depends on the training data item, and the system can determine the conditional entropy model using a hyper-encoder neural network (404). Using a conditional entropy model that is adaptive and input data-dependent (rather than, e.g., a static, predetermined entropy model) can generally enable data to be compressed more effectively.

To this end, the system processes the latent representation of the training data item using the hyper-encoder neural network and in accordance with current values of the hyper-encoder network parameters to generate a latent representation of the conditional entropy model, i.e., a "hyper-prior". In one example, the hyper-encoder neural network is a convolutional neural network and the hyper-prior is a multi-channel feature map output by the final layer of the hyper-encoder neural network.

The system quantizes and entropy encodes the hyper-prior. For example, the system can quantize the hyper-prior use a quantizing engine. Quantizing a value refers to mapping the value to a member of a discrete set of possible code symbols. For example, the set of possible code symbols may be integer values, and the system may perform quantization by rounding real-valued numbers to integer values. The system can entropy encode the quantized hyper-prior using, e.g., a pre-determined entropy model defined by one or more predetermined code symbol probability distributions. In one example, the predetermined entropy model may specify a respective predetermined code symbol probability distribution for each code symbol of the quantized hyper-prior. In this example, the system may entropy encode each code symbol of the quantized hyper-prior using the corresponding predetermined code symbol probability distribution. The system can use any appropriate entropy encoding technique, e.g., a Huffman encoding technique, or an arithmetic encoding technique.

The system determines the conditional entropy model using the hyper-prior. In one example, the system processes the quantized hyper-prior using a hyper-decoder neural network, and then processes the hyper-decoder neural network output using an entropy model neural network to generate an output that defines the conditional entropy model. For example, the entropy model neural network may generate an output that specifies respective distribution parameters defining each code symbol probability distribution of the conditional entropy model.

The system generates a compressed representation of the training data item (406) by quantizing the latent representation of the training data item, e.g., using the quantizing engine, and then entropy encoding the quantized latent representation in accordance with the entropy model, which can be either a predetermined entropy model or a conditional entropy model. For example, the system can entropy encode each code symbol of the quantized latent representation of the data using a respective code symbol probability distribution defined by the conditional entropy model. The system can use any appropriate entropy encoding technique, e.g., a Huffman encoding technique, or an arithmetic encoding technique.

The compressed representation of the training data item can then be determined based on the compressed (i.e., entropy encoded) quantized latent representation of the training data item, and, in implementations where a conditional entropy model is used, the compressed (i.e., entropy encoded) quantized hyper-prior, e.g., by concatenating them. In other words, the compressed representation, which may be in form of a bit stream (e.g., a string of binary digits), includes a compressed (i.e., entropy encoded) quantized latent representation of the data, and, optionally a compressed (i.e., entropy encoded) quantized hyper-prior.

The system generates a reconstruction of the training data item (408) from the compressed representation, e.g., by performing operations that approximately invert the operations described above with reference to steps 402-406, including processing the compressed representation using a decoder neural network and in accordance with decoder network parameters to generate as output an (approximate or exact) reconstruction of the training data item.

The system processes the reconstruction of the training data item, and, optionally, the compressed representation of the training data item, using a discriminator neural network and in accordance with current values of discriminator network parameters to generate a discriminator network output (410). The discriminator network output specifies a discriminator's classification of the reconstruction of the training data item. That is, the system uses the discriminator neural network to predict whether a data item provided as input to the discriminator neural network is an original copy or a reconstructed copy generated by the decoder neural network from the compressed representation of the original copy.

In this regard, the decoder neural network (also referred to as a generator neural network) and the discriminator neural network constitute two competing models under a generative adversarial network (GAN) training scheme. The objective of the decoder neural network is to generate reconstructions of training data items (e.g., reconstructed images) that resemble the real training data items (e.g., original images), and the objective of the discriminator neural network is to discriminate between real training data items (e.g., original images) and reconstructions of training data items (e.g., reconstructed images).

The system evaluates a first loss function (412) that depends on (i) a first term measuring a compression rate of the conditional entropy model, (ii) a second term measuring a quality of the reconstruction, and (iii) a third term measuring a difference between the discriminator's classification of the reconstruction of the training data item and a ground truth classification of the training data item.

In particular, the first term and the second term collectively trains the neural network according to a rate-distortion trade-off objective. To measure the compression rate of the conditional entropy model, the first term can characterize the size (e.g., in bits) of the compressed code symbols representing the training data item. The second term can evaluate a measure of difference (or distortion) between the training data item and the reconstruction of the training data item. For example, the difference can be evaluated as a mean squared (MSE) error, a Learned Perceptual Image Patch Similarity (LPIPS), or both. LPIPS is described in more detail at Ting-Chun Wang, Ming-Yu Liu, Jun-Yon Zhu, Andrew Tao, Jan Kautz, and Bryan Catanzaro. High resolution image synthesis and semantic manipulation with conditional gans. In IEEE Conference on Computer Vision and Pattern Recognition (CVPR), 2018.

The third term, which measures the difference between the discriminator's classification of the reconstruction of the training data item and the ground truth classification of the training data item, trains the decoder neural network to generate realistic-looking reconstructions that can "fool" the discriminator neural network into classifying it as the original training data item, i.e., instead of as the reconstructed training data item. In various cases, the ground truth classification of the training data item may be associated (as a label) with or derived (by the system) from the training data item.

To train the discriminator neural network to accurately discriminate between original and reconstructed training data items, the system also evaluates a second loss function that depends specifically on the difference between the discriminator's classification of the reconstruction of the training data item and the ground truth classification of the training data item.

An example of the first and second loss functions is provided below.

$$\mathcal{L}_{EGP} = \mathbb{E}_{x \sim P_X}[\lambda r(y) + d(x, x') - \beta \log(D(x', y))],$$

$$\mathcal{L}_D = \mathbb{E}_{x \sim P_X}[-\log(1 - D(x', y))] + \mathbb{E}_{x \sim P_X}[-\log(D(x, y))]$$

where E, G, P, and D refer to the encoder neural network, decoder neural network, hyper-encoder neural network, and discriminator neural network, respectively, and where $r(y) = -\log(P(y))$, where $p(y)$ refers to the probability of the code symbols representing the input data y under the conditional entropy model $p(\cdot)$ used to entropy encode the code symbols, and $d = k_M MSE + k_P d_P$, where $d_P = LPIPS$.

In some implementations, the first term, the components of the second term (which correspond to the different types of differences measured in the second term), or the third term are each weighted by a respective, tunable weighing factor. In the example above, $\lambda$, $\beta$, $K_M$ and $K_p$ are such weighting factors that control the trade-off between different terms included in the first loss function. Each weighting factor may be associated with a value that is set prior to the commencement of the training of the neural networks and that impacts the effectiveness of the training process.

In some such implementations, however, the weighting factor can be an adaptive one, i.e., a weighting factor the value of which may change over the entire training process.

For example, an adaptive weighting factor $\lambda'$, which in turn includes two adaptive weighting factors $\lambda^{(a)}$ and $\lambda^{(b)}$, can be used in place of the fixed weighting factor $\lambda$. Further, in this example, the system also makes use of a "rate target" hyper-parameter $r_t$, which corresponds to a target (e.g., user-specified) compression rate. The system can thus effectively train the neural networks with an average bitrate close to $r_t$ by setting $\lambda' = \lambda^{(a)}$ if $r(y) > r_t$, and $\lambda' = \lambda^{(b)}$ otherwise, where $\lambda^{(a)} >> \lambda^{(b)}$.

In other words, in this example, the system can receive (or otherwise determine) a target compression rate at the beginning of the training and, during the training process, adapt a value of the weighting factor associated with the first term of the first loss function in accordance with the target compression rate by: (i) increasing the value of the weighting factor associated with the first term when the compression rate of the entropy model is higher than the target compression rate, and (ii) decreasing the value of the weighting factor associated with the first term when the compression rate of the entropy model is lower than the target compression rate.

The system determines, e.g., using back-propagation, an update to the current values of the network parameters (414) based on determining a gradient with respect to the network parameters of the first loss function. Specifically, the system determines, based on the gradient, respective updates to current parameter values of the encoder neural network, the decoder neural network, and, when included, the hyper-encoder neural network.

The system also determines an update to current values of discriminator network parameters based on determining a gradient with respect to the discriminator network parameters of the second loss function.

The system then proceeds to update the current values of the network parameters based on the determined updates in accordance with based on an appropriate gradient descent optimization technique (e.g., an RMSprop or Adam optimization procedure). Alternatively, the system only proceeds to update the current parameter values once the process 400 has been performed for an entire mini-batch of training data items. A mini-batch generally includes a fixed number of training data items, e.g., 16, 64, or 256. In other words, the system combines, e.g., by computing a weighted or unweighted average between, respective updates that are determined during the fixed number of iterations of process 400 and proceeds to update the current parameter values based on the combined update.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for training an encoder neural network configured to receive a data item and to process the data item in accordance with current values of a plurality of encoder network parameters to output a compressed representation of the data item, wherein the training comprises, receiving a plurality of training data items, and, for each training data item:
    processing the training data item using the encoder neural network to generate a latent representation of the training data item;
    generating a compressed representation of the training data item from the latent representation of the training data item;
    processing the compressed representation using a decoder neural network to generate a reconstruction of the training data item;
    processing the reconstruction of the training data item using a discriminator neural network to generate a discriminator network output that specifies a discriminator's classification of the reconstruction of the training data item;
    evaluating a first loss function that depends on (ii) a reconstruction term measuring a quality of the reconstruction, and (iii) a discriminator term measuring a difference between the discriminator's classification of the reconstruction of the training data item and a ground truth classification of the training data item; and
    determining an update to the current values of the encoder network parameters based on determining a gradient with respect to the encoder network parameters of the first loss function.

2. The method of claim 1, further comprising determining an update to current values of decoder network parameters of the decoder neural network based on determining a gradient with respect to the encoder network parameters of the first loss function.

3. The method of claim 1, wherein the data item comprises an image or a video frame.

4. The method of claim 1, wherein the encoder neural network and the decoder neural network are each a respective convolutional neural network.

5. The method of claim 1, further comprising determining an update to current values of discriminator network parameters based on determining a gradient with respect to the discriminator network parameters of a second loss function that depends on the difference between the discriminator's classification of the reconstruction of the training data item and a ground truth classification of the training data item.

6. The method of claim 1, wherein the reconstruction term comprises a term that measures a mean squared error between the training data item and the reconstruction of the training data item.

7. The method of claim 1, wherein the reconstruction term comprises a term that measures a perceptual loss between the training data item and the reconstruction of the training data item.

8. The method of claim 7, wherein the perceptual loss is a Learned Perceptual Image Patch Similarity (LPIPS).

9. The method of claim 1, wherein generating a compressed representation of the training data item from the latent representation of the training data item comprises:
    quantizing the latent representation of the training data item generated by the encoder neural network.

10. A system comprising one or more computers and one or more storage devices storing instructions that when executed by one or more computers cause the one or more computers to perform operations for training an encoder neural network configured to receive a data item and to process the data item in accordance with current values of a plurality of encoder network parameters to output a compressed representation of the data item, wherein the training comprises, receiving a plurality of training data items, and, for each training data item:
  processing the training data item using the encoder neural network to generate a latent representation of the training data item;
  generating a compressed representation of the training data item from the latent representation of the training data item;
  processing the compressed representation using a decoder neural network to generate a reconstruction of the training data item;
  processing the reconstruction of the training data item using a discriminator neural network to generate a discriminator network output that specifies a discriminator's classification of the reconstruction of the training data item;
  evaluating a first loss function that depends on (ii) a reconstruction term measuring a quality of the reconstruction, and (iii) a discriminator term measuring a difference between the discriminator's classification of the reconstruction of the training data item and a ground truth classification of the training data item; and
  determining an update to the current values of the encoder network parameters based on determining a gradient with respect to the encoder network parameters of the first loss function.

11. The system of claim 10, further comprising determining an update to current values of decoder network parameters of the decoder neural network based on determining a gradient with respect to the encoder network parameters of the first loss function.

12. The system of claim 10, wherein the data item comprises an image or a video frame.

13. The system of claim 10, wherein the encoder neural network and the decoder neural network are each a respective convolutional neural network.

14. The system of claim 10, further comprising determining an update to current values of discriminator network parameters based on determining a gradient with respect to the discriminator network parameters of a second loss function that depends on the difference between the discriminator's classification of the reconstruction of the training data item and a ground truth classification of the training data item.

15. The system of claim 10, wherein the reconstruction term comprises a term that measures a mean squared error between the training data item and the reconstruction of the training data item.

16. The system of claim 10, wherein the reconstruction term comprises a term that measures a perceptual loss between the training data item and the reconstruction of the training data item.

17. The system of claim 16, wherein the perceptual loss is a Learned Perceptual Image Patch Similarity (LPIPS).

18. The system of claim 10, wherein generating a compressed representation of the training data item from the latent representation of the training data item comprises:
  quantizing the latent representation of the training data item generated by the encoder neural network.

19. One or more non-transitory computer-readable storage media storing instructions that when executed by one or more computers cause the one or more computers to perform operations for training an encoder neural network configured to receive a data item and to process the data item in accordance with current values of a plurality of encoder network parameters to output a compressed representation of the data item, wherein the training comprises, receiving a plurality of training data items, and, for each training data item:
  processing the training data item using the encoder neural network to generate a latent representation of the training data item;
  processing the latent representation using a hyper-encoder neural network to determine a conditional entropy model;
  generating a compressed representation of the training data item including entropy encoding the latent representation of the training data item in accordance with the conditional entropy model;
  processing the compressed representation using a decoder neural network to generate a reconstruction of the training data item;
  processing the reconstruction of the training data item using a discriminator neural network to generate a discriminator network output that specifies a discriminator's classification of the reconstruction of the training data item;
  evaluating a first loss function that depends on (i) a first term measuring a compression rate of the conditional entropy model, (ii) a second term measuring a quality of the reconstruction, and (iii) a third term measuring a difference between the discriminator's classification of the reconstruction of the training data item and a ground truth classification of the training data item; and
  determining an update to the current values of the encoder network parameters based on determining a gradient with respect to the encoder network parameters of the first loss function.

20. The computer-readable storage media of claim 19, wherein generating a compressed representation of the training data item from the latent representation of the training data item comprises:
  quantizing the latent representation of the training data item generated by the encoder neural network.

* * * * *